(12) United States Patent
Oishi (10) Patent No.: US 6,907,125 B1
(45) Date of Patent: Jun. 14, 2005

(54) APPARATUS AND METHOD FOR PROCESSING INFORMATION AND CORRECTING AN ERROR IN A DECRYPTED ERROR CORRECTION CODE

(75) Inventor: Akihiro Oishi, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 09/206,949

(22) Filed: Dec. 8, 1998

(30) Foreign Application Priority Data

Dec. 9, 1997 (JP) .............................................. 9-338647
Dec. 3, 1998 (JP) ............................................ 10-344053

(51) Int. Cl.$^7$ ...................... H04N 7/167; H03M 13/00
(52) U.S. Cl. ..................................... 380/239; 714/780
(58) Field of Search ........................... 380/268, 30, 54, 380/202, 49, 239; 714/780

(56) References Cited

U.S. PATENT DOCUMENTS

| | | | | |
|---|---|---|---|---|
| 4,608,456 A | * | 8/1986 | Paik et al. ..................... 380/28 |
| 5,285,497 A | * | 2/1994 | Thatcher ...................... 380/49 |
| 5,586,186 A | * | 12/1996 | Yuval et al. ................... 380/30 |
| 5,793,871 A | * | 8/1998 | Jackson ....................... 380/54 |
| 5,889,860 A | * | 3/1999 | Eller et al. .................... 705/26 |
| 6,047,069 A | * | 4/2000 | Hogan ........................ 380/268 |
| 6,119,230 A | * | 9/2000 | Carter ......................... 713/200 |
| 6,161,209 A | * | 12/2000 | Moher ......................... 714/780 |
| 6,215,875 B1 | * | 4/2001 | Nohda ......................... 380/202 |
| 6,219,157 B1 | * | 4/2001 | Shikakura et al. ..... 358/426.04 |
| 6,278,386 B1 | * | 8/2001 | Hogan ......................... 341/58 |
| 6,292,790 B1 | * | 9/2001 | Krahn et al. .................. 700/79 |
| 6,463,153 B1 | * | 10/2002 | Sako et al. ................. 380/201 |

OTHER PUBLICATIONS

Schneier, Applied Cryptography, 1996, pp. 357,358.*

* cited by examiner

*Primary Examiner*—Douglas Meislahn
(74) *Attorney, Agent, or Firm*—Fitzpatrick, Cella, Harper & Scinto (57) ABSTRACT

An apparatus and method for processing information, including an error-correcting coding device for encoding information data into at least one error-correcting code, the error-correcting code containing the information data and a parity check code, and an encryption device for encrypting at least a portion of the information data and at least a portion of the parity check code contained in the error-correcting code. In this manner, unauthorized copying of the digital data is prevented and the copyright on the data is protected. In one embodiment, unauthorized users can partially view image data that is not selected for encryption by an encryption selector.

4 Claims, 10 Drawing Sheets

COMPRESSED IMAGE DATA
CORRESPONDING TO ONE FRAME

APPARATUS AND METHOD FOR PROCESSING INFORMATION AND CORRECTING AN ERROR IN A DECRYPTED ERROR CORRECTION CODE

BACKGROUND OF THE INVENTION

1. Field of the Invention

The present invention relates to an apparatus and method for processing information and, more particularly, to a technique or method for protecting the copyright of digital data of images, sounds, text, etc.

2. Description of the Related Art

Recently, with the development of information communication systems and large-capacity recording mediums, it is possible to exchange large amounts of image and sound digital data via a network, or by using a recording medium such as a compact disc read-only memory (CD-ROM), a magneto-optical disc, or a magnetic tape.

In general, digital data is easy to copy, transmit, store and is also free of quality deterioration during copying, transmission and storage. These characteristics make it easy for a third party to read or copy digital data, thereby enabling infringement of the copyright on the data. A means for preventing copying of digital data to protect the copyright on the digital data is, therefore, needed.

A method has been practiced in which a copy inhibition flag is inserted at certain positions in digital video and audio data to prevent unauthorized copying.

However, this conventional method, in which data itself is maintained in the original form, is not effective in preventing unauthorized copying of data, because data protected by this method can still be copied by dump copying, for example.

Encryption techniques have recently been proposed as alternative methods for protecting digital data. However, if digital data is encrypted, the data cannot be used by ordinary users who want to copy, transmit and store the data in an authorized manner.

SUMMARY OF THE INVENTION

An object of the present invention is to solve the above-described problems.

Another object of the present invention is to provide an information processing apparatus arranged so as to practice a technique or method for preventing unauthorized copying, or the like, of digital data to protect the copyright on the digital data while enabling only authorized users to grasp, or access, the contents of the digital data.

Still another object of the present invention is to provide an information processing apparatus arranged to practice a technique or method for further improving digital data security to prevent unauthorized copying for the purpose of protecting the copyright of the digital data.

To achieve these objects, according to one aspect of the present invention, an information processing apparatus includes error-correcting coding means for encoding information data into at least one error-correcting code, the error-correcting code containing the information data and a parity check code, and encryption means for encrypting at least a portion of the information data and at least a portion of the parity check code contained in the error-correcting code.

According to another aspect of the present invention, an information processing apparatus includes decryption means for decrypting an error-correcting code including at least partially encrypted information data and at least a partially encrypted parity check code, and decoding means for correcting an error in the decrypted error-correcting code output from the decryption means.

According to still another aspect of the invention, a method of processing information comprises the steps of: (i) encoding information data into at least one error-correcting code, the error-correcting code containing the information data and a parity check code, and (ii) encrypting at least a portion of the information data and at least a portion of the parity check code contained in the error-correcting code.

According to yet another aspect of the invention, an information processing method comprises the steps of: (i) decrypting an error-correcting code including at least partially encrypted information data and at least a partially encrypted check code, and (ii) correcting an error in the decrypted error-correcting code output from the decryption step.

According to yet another aspect of the invention, an apparatus for processing information comprises error-correcting coding means for encoding information data into at least one error-correcting code, and encryption means for encrypting a portion of the at least one error-correcting code containing information data encrypted into the error-correcting code.

According to yet another aspect of the invention, an information processing apparatus comprises decryption means for decrypting a portion of an encrypted error-correcting code containing encrypted information data, and decoding means for correcting an error in the decrypted information data, encrypted into the error-correcting code and output from the decryption means.

According to a further aspect of the invention, an information processing method comprises the following steps: (i) encoding information data into at least one error-correcting code, and (ii) encrypting a portion of the at least one error-correcting code containing information data encrypted into the error-correcting code.

According to still another aspect of the invention, a method of processing information comprises the following steps: (i) decrypting a portion of an encrypted error-correcting code containing information data, and (ii) correcting an error in the decrypted information data encrypted into the error-correcting code and output from the decryption step.

According to yet another aspect of the present invention, an information processing apparatus comprises error-correcting coding means for encoding information data into at least one error-correcting code, and encryption means for double-encryption processing of the information data encrypted into the at least one error-correcting code.

According to still another aspect of the present invention, an apparatus for processing information comprises decryption means for decrypting a double-encryption error-correcting code, and decoding means for correcting an error in the decrypted error-correcting code, decrypted by said decryption means.

According to a further aspect of the present invention, a method of processing information comprises the following steps: (i) encoding information data into an error-correcting code, and (ii) double-encryption processing the information data in the error-correcting code.

In still another aspect of the invention, according to the present invention, a method of processing information comprises the steps of: (i) decrypting a double-encryption error-correcting code, and (ii) correcting an error in the decrypted error-correcting code output from the decryption step.

According to a further aspect of the invention, an information processing apparatus comprises error-correcting coding means for encoding information data into at least one error-correcting code, the error-correcting code containing the information data and a parity check code, encryption means for encrypting at least a portion of the information data and at least a portion of the parity check code contained in the error-correcting code, decryption means for decrypting the at least one error-correcting code including at least partially encrypted information data and at least one partially encrypted parity check code, wherein the decryption means corresponds to the encryption means, and decoding means for correcting an error in the decrypted error-correcting code, wherein the decoding means corresponds with the encoding means.

According to yet another aspect of the invention, a method of processing information comprises the steps of: (i) encoding information data into at least one error-correcting code, the error-correcting code containing the information data and a parity check code; (ii) encrypting at least a portion of the information data and at least a portion of the parity check code contained in the error-correcting code; (iii) decrypting the at least one error-correcting code including at least partially encrypted information data and at least a partially encrypted check code, and (iv) correcting an error in the decrypted error-correcting code output from the decryption step.

According to still another aspect of the invention, an apparatus for processing information comprises error-correcting coding means for encoding information data, encryption means for double-encryption processing of the information data, decryption means for decrypting double-encrypted information data; and decoding means for correcting an error in the decrypted information data.

According to still a further aspect of the invention, a method of processing information comprises the following steps: (i) encoding information data; (ii) double-encryption processing the information data; (iii) decrypting the double-encryption information data; and (iv) correcting errors in the decrypted information data.

DESCRIPTION OF THE PREFERRED EMBODIMENTS (First Embodiment)

An information processing apparatus, representing an embodiment of the present invention, will be described below in detail with reference to the accompanying drawings. The information processing apparatus, described below by way of example, is an apparatus for recording and reproducing digital image data, e.g., a digital video recorder.

Figure 1:
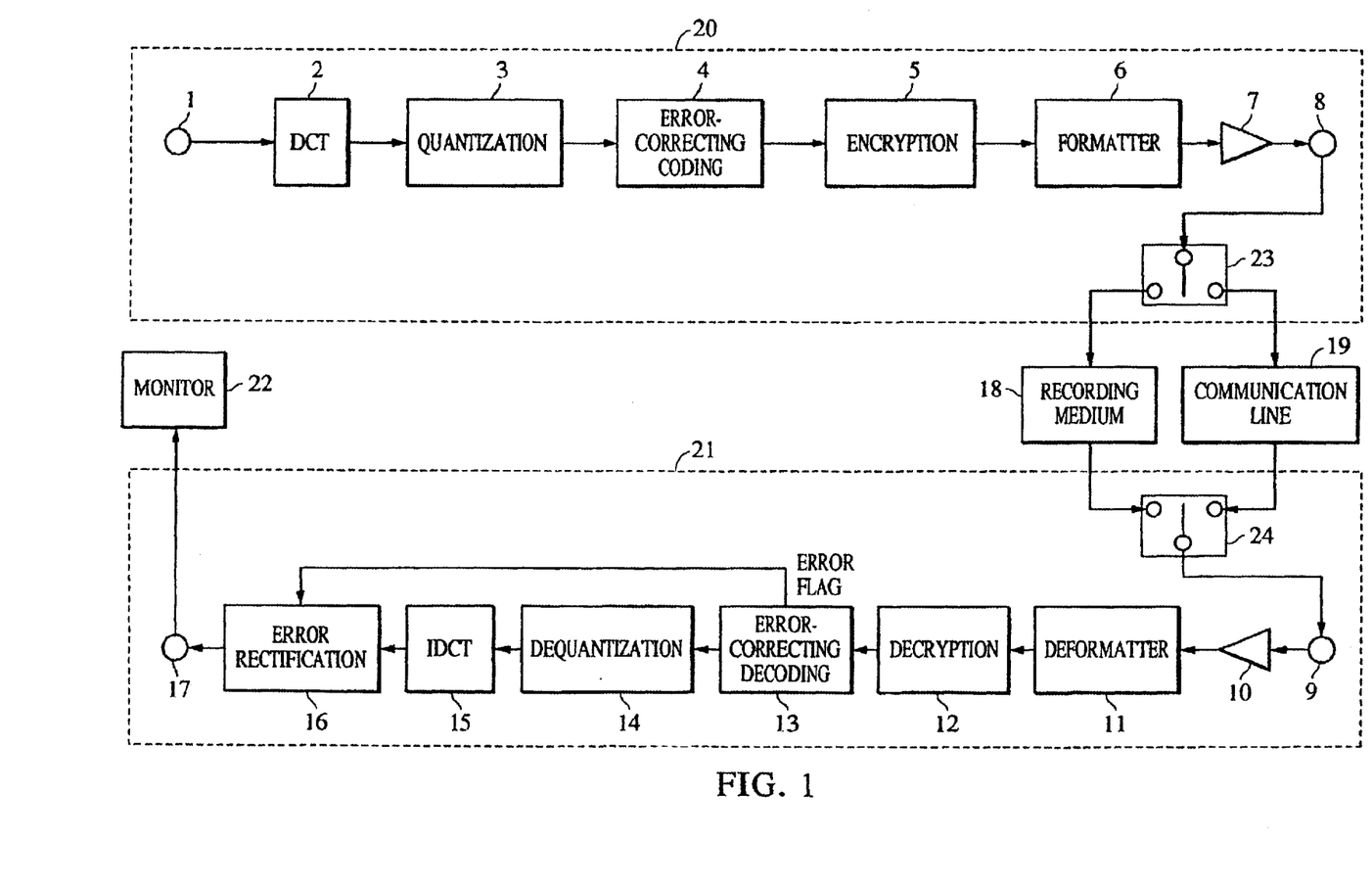
FIG. 1 is a block diagram showing the configuration of an information processing apparatus which represents a first embodiment of the present invention.

FIG. 1 is a block diagram showing the configuration of the recording and reproducing apparatus of the first embodiment. The recording and reproducing apparatus shown in FIG. 1 comprises a recording (or output) unit 20 and a reproducing (or input) unit 21.

In the recording (or output) unit 20 shown in FIG. 1, digital image data input through an input terminal 1 is orthogonally transformed by a discrete cosine transform (DCT) circuit 2 and is then quantized by a quantization circuit 3, thereby compressing the digital image data. This compressed digital data undergoes error-correcting coding processing, performed by an error-correcting coding circuit 4. Information data and a parity check code obtained from the error-correcting coding circuit are encrypted by an encryption circuit 5.

The encrypted data is converted into a predetermined format by a formatter 6, amplified by an amplifier 7, and then output through an output terminal 8. An example of the amplifier 7 is a recording amplifier, and an example of the output terminal 8 is a recording terminal. The encrypted data, output from the output terminal 8, is recorded onto a recording medium 18. In this embodiment, the formatter 6 converts the encrypted data into a format that is compatible with the recording medium 18, a software application or a device using the recording medium 18, or the like. The recording medium 18 can be a magnetic tape, a magneto-optical disk, a fixed disk, or the like.

The output terminal 8 may be connected, by a connector 23, to an external network (communication line) 19. With this connection, encrypted data, output from the output terminal 8, is transmitted to an external apparatus (not shown) via the network 19. The encrypted data is then used by an application operating in the external apparatus or, alternatively, the data can be recorded onto a recording medium 18. In the network transmission, the formatter 6 converts the encrypted data into a format compatible with an application operating in the network 19 or the external apparatus.

The processing by the error-correcting coding circuit 4 and the encryption circuit 5 will now be described with reference to FIGS. 2A, 2B and 3.

Figure 2A:
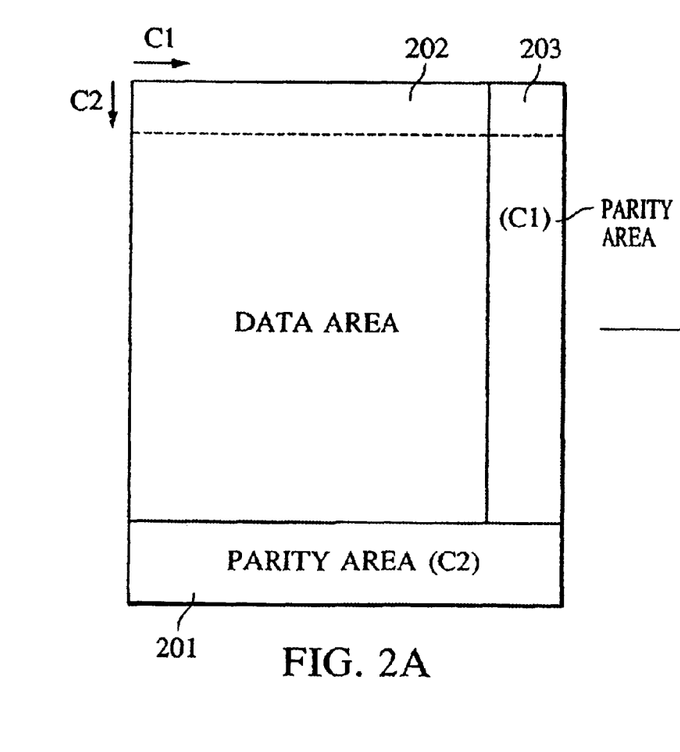
FIGS. 2A and 2B are diagrams for explaining encryption processing in the first embodiment.
Figure 2B:
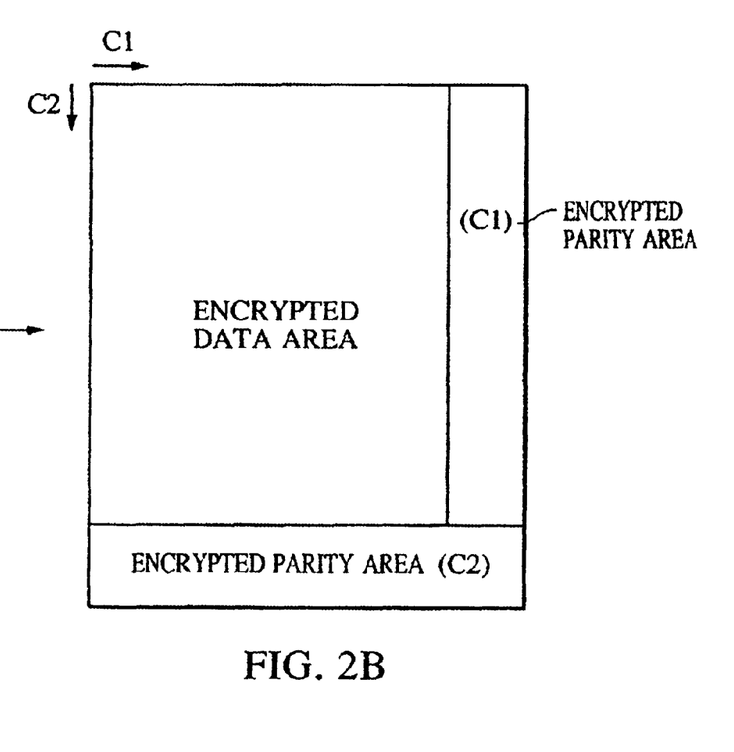

FIG. 2A shows a unit of data to be encoded into an error correcting code. Referring to FIG. 2A, a parity check code for a parity check in one direction (horizontal direction) is a code C1 and this direction is referred to as a C1 direction. Also, a parity check code for a parity check in another direction (vertical direction) is a code C2 and this direction is referred to as a C2 direction.

Figure 3:
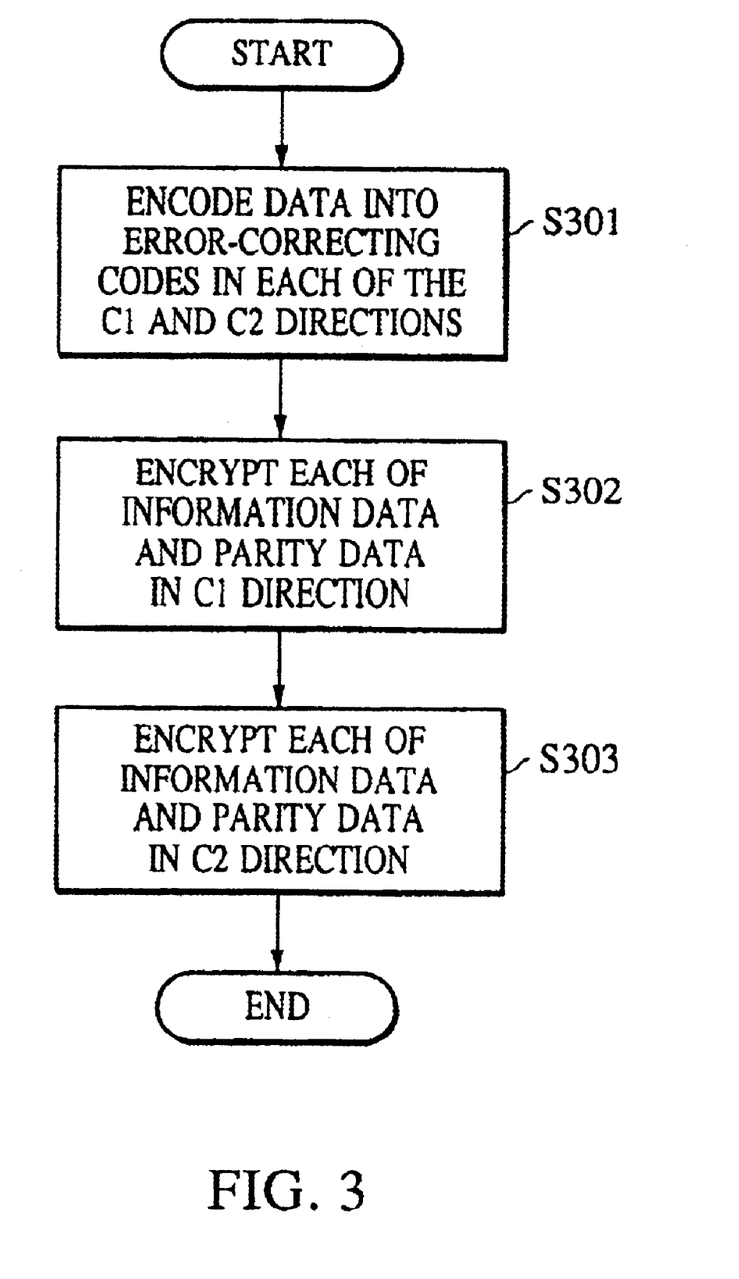
FIG. 3 is a flowchart of an encryption process in the information processing apparatus of the first embodiment.

FIG. 3 is a flowchart showing an encryption process of the first embodiment. Specifically, in step S301, data is encoded into error-correcting codes in each of the C1 and C2 directions. Then, in step S302, information data and parity data are encrypted in the C1 direction. Finally, in step S303, information data and parity data are encrypted in the C2 direction.

Data quantized by the quantization circuit 3 is input to the error-correcting coding circuit 4 so as to form a block of horizontal lines shown in FIG. 2A, starting from the upper left corner of the block. The data is input in the C1 direction with respect to each line (as shown by the dashed horizontal line) and in the C2 direction from line to line. The error-correcting coding circuit 4 calculates an error-correction parity (C1, C2) based on a generating polynomial with a set of data items in each of the horizontal and vertical directions (in step S301 shown in FIG. 3). Each set of data items, in the C1 and C2 directions, is given a parity. In this manner, the error-correcting coding circuit 4 forms the block of data shown in FIG. 2A. A first error-correcting code comprises information data 202 and parity check data 203 in the C1 direction. A second error-correcting code comprises information data 202 and parity check data 201, in the C2 direction. Information data 202 in the error-correcting codes correspond to a plurality of DCT blocks.

The encryption circuit 5 encrypts at least a portion of the parity check code (C1 or C2) and at least a portion of the information code in each of the first and second error-correcting codes formed as shown FIG. 2A. The encryption forms encrypted data and parity check codes as shown FIG. 2B (S302 and S303 as shown in FIG. 3). The apparatus is arranged to decrypt the encrypted data on the reproducing (or input) unit 21 side, before decoding of the error-correcting code as described below, so it is necessary to encrypt the data by using, for example, an exclusive OR of each data item and a constant (or a value obtained by incrementing or decrementing an initial value) to avoid decryption failure due to a data error. In the encryption circuit 5, the codes C1 and C2 are encrypted with the same encryption key and with the same encryption circuit. However, the codes C1 and C2 may be encrypted with different encryption keys.

Decryption of the encrypted data in the reproducing (or input) unit 21 will now be described with reference to FIGS. 1 and 4.

Figure 4:
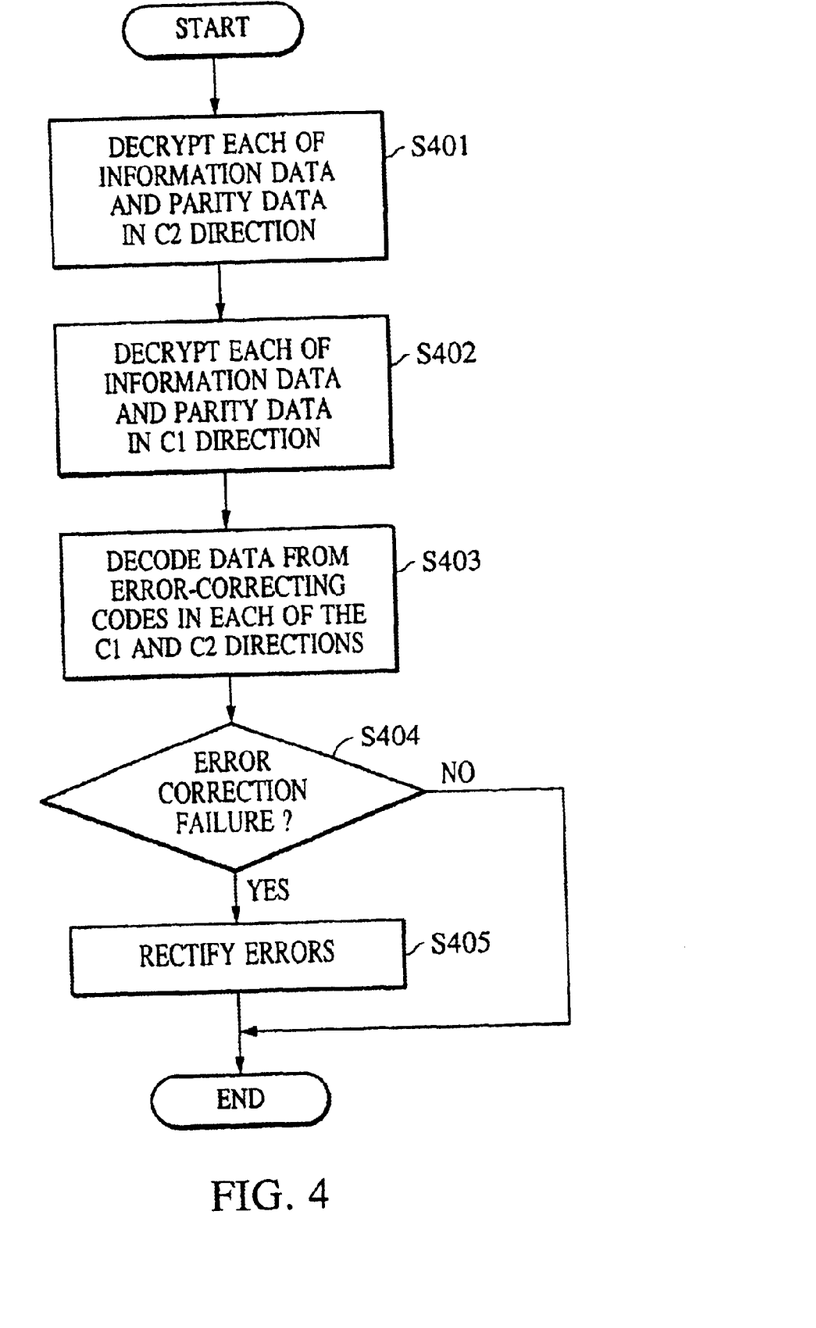
FIG. 4 is a flowchart of a decryption process in the information processing apparatus of the first embodiment.

FIG. 4 is a flowchart showing a decryption process of the first embodiment. In particular, in step S401, information data and parity data are decrypted in the C2 direction. In step S402, information data and parity data are decrypted in the C1 direction. Then, in step S403, data from the error-correcting codes, in each of the C1 and C2 directions, is decoded. In step S404, an error-correction failure is determined. If an error-correction failure is determined in step S404, the error is rectified in step S405. Otherwise, the flow proceeds to the end of the flowchart, as seen in FIG. 4.

Referring to FIG. 1, encrypted data is input from the recording medium 18 or network 19, through connector 24, to an input terminal 9, and then through a reproducing amplifier 10. The amplified encrypted data is then deformatted by a deformatter 11 to a data format suitable for processing in the reproducing unit 21.

The deformatted, encrypted data is then decrypted by a decryption circuit 12 (S401 and S402 in FIG. 4) and thereafter, undergoes error correction performed by an error-correcting decoding circuit 13 (S403). At this time, the error-correcting decoding circuit 13 outputs an error flag to indicate whether an error correction failure has resulted with respect to each error-correcting code.

The error-corrected image data is expanded by a dequantization circuit 14 and is then orthogonally, inversely transformed by an inverse discrete cosine transform (IDCT) circuit 15 to restore the data to its original form. Further, the IDCT data is supplied to an error rectification circuit 16 to undergo error rectification processing, such as interpolation according to the error flag supplied from the error-correcting decoding circuit 13, or the like. The data resulting from this rectification processing is output through an output terminal 17 (S405 as shown in FIG. 4). The output from the output terminal 17 is supplied to a monitor 22 (e.g., a digital television) to be displayed. The monitor 22 may be integrally combined with the reproducing (or input) unit 21.

Decryption of the encrypted data is thus performed by the recording and reproducing apparatus of the first embodiment of the present invention. As discussed above, the encrypted parity check codes or the encrypted portion of each parity check code can be decrypted together with the information data 202. Consequently, by using both the recording and reproducing units of the first embodiment, one can correctly decrypt and use reproduced or externally supplied encrypted data.

The process of decrypting reproduced or externally-supplied encrypted image data by a recording and reproducing apparatus arranged differently from the apparatus of the first embodiment will now be described with reference to FIG. 5. The following description explains a case in which image data is encrypted according to the first embodiment of the present invention, but the reproduction or decryption is unauthorized, or is attempted without a corresponding reproducing (or input) unit 21.

Figure 5:
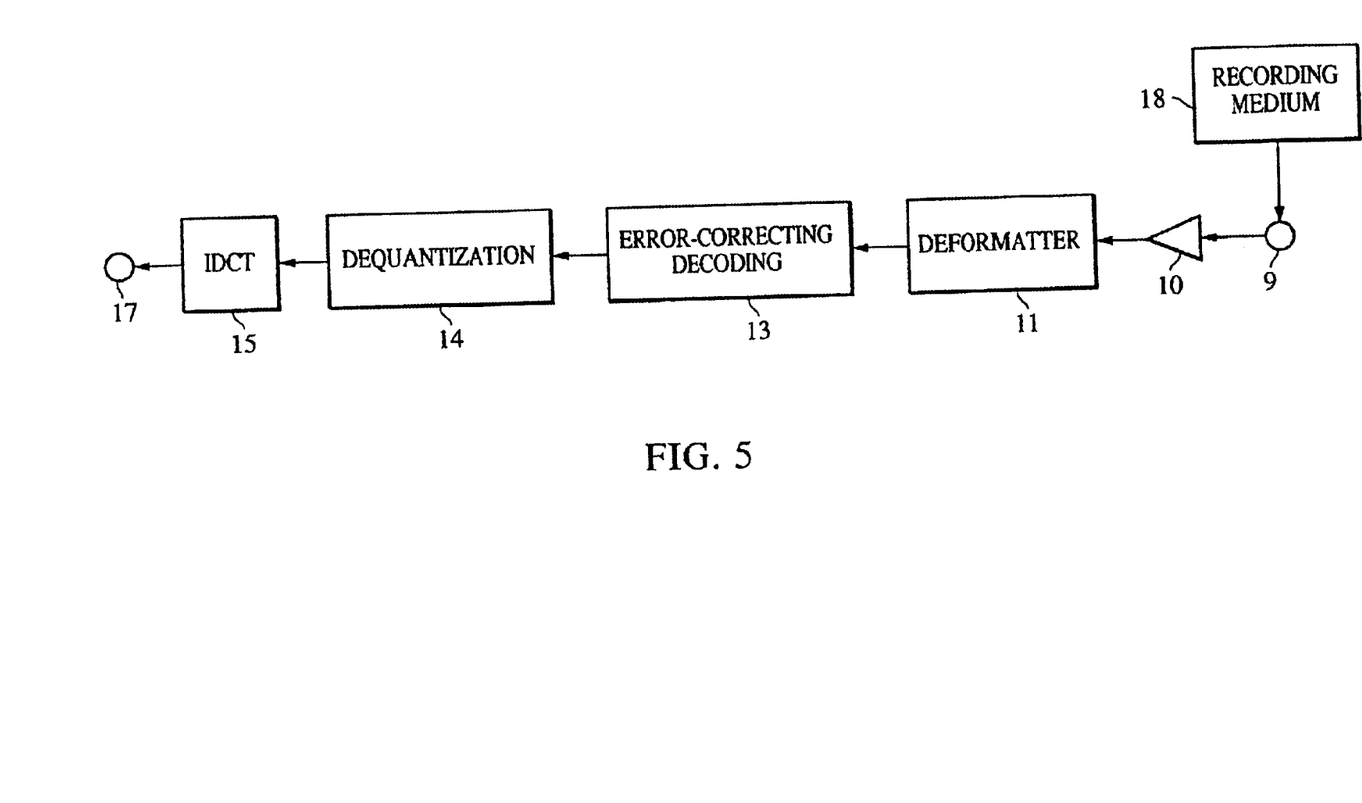
FIG. 5 is a block diagram showing the configuration of another information processing apparatus.

FIG. 5 shows a recording and reproducing apparatus differing in configuration from the apparatus of the first embodiment. Particularly, FIG. 5 shows a different reproducing (or input) unit side. Unlike the reproducing unit 21 shown in FIG. 1, the apparatus shown in FIG. 5 has no decryption circuit 12.

Referring to FIG. 5, encrypted data, reproduced from recording medium 18, is input via an input terminal 9 and is then amplified by a reproducing amplifier 10. The amplified, encrypted data is deformatted by a deformatter 11. The deformatted encrypted data is input directly to an error-correcting decoding circuit 13 to correct errors in the data, without first being decrypted.

In this apparatus, encrypted data is input directly to the error-correcting decoding circuit 13, as mentioned above. Therefore, even if the data is processed by error correction processing, data errors cannot be corrected and the error flag is set with respect to all error-correcting codes. In this situation, it is necessary to interpolate the entire encrypted data, whether it is reproduced from recording medium 18 or externally supplied. It is, therefore, impossible to use correct information data by the unauthorized process without decrypting the encrypted data. That is, without a corresponding decryption circuit, unauthorized copying of digital data is prevented and protection of the copyright on the digital data is achieved with respect to a user using the recording and reproducing apparatus shown in FIG. 5.

In the first embodiment of the present invention, as described above, at least a portion of the parity check code (201 or 203) and at least a portion of the information data 202 are encrypted for each of the first and second error-correcting codes. The arrangement of the first embodiment in which encryption is performed as described above has the following advantage, in contrast with the arrangement in which only parity check code 203 is encrypted before being recorded or output, as discussed below.

For example, in the case where only a parity check code 203 is encrypted, information data 202 can be processed by an unauthorized process that removes only the parity check code 203. In the first embodiment of the present invention, information data 202 as well as the parity check codes are encrypted. Hence, correct digital data cannot be used unless decryption is performed before error-correcting processing. As a result, digital data security is effectively improved.

Further, for example, in the case wherein only the parity check code is encrypted, there is a substantially high possibility of a coincidence between the parity check codes before and after encryption. The chance of coincidence results, in part, because the parity check code consists of a small number of bits. Also, when only the parity check code is encrypted, there is a risk of a correction error. As a result, there is a possibility of restoring unexpected image data resulting from the correction error. If this occurs, a distorted, restored image is output. In contrast, the first embodiment of the present invention is free from such a drawback.

In the first embodiment, the first error-correcting code in the C1 direction and the second error-correcting code in the C2 direction are encrypted. That is, double-encryption processing is performed in combination with error correction processing of one unit of compressed image data. In this manner, digital data security is further improved, so that unauthorized data copying is prevented and the copyright on the image is protected.

(Second Embodiment)

A second embodiment of the present invention will be described in detail with reference to the drawings.

Figure 6:
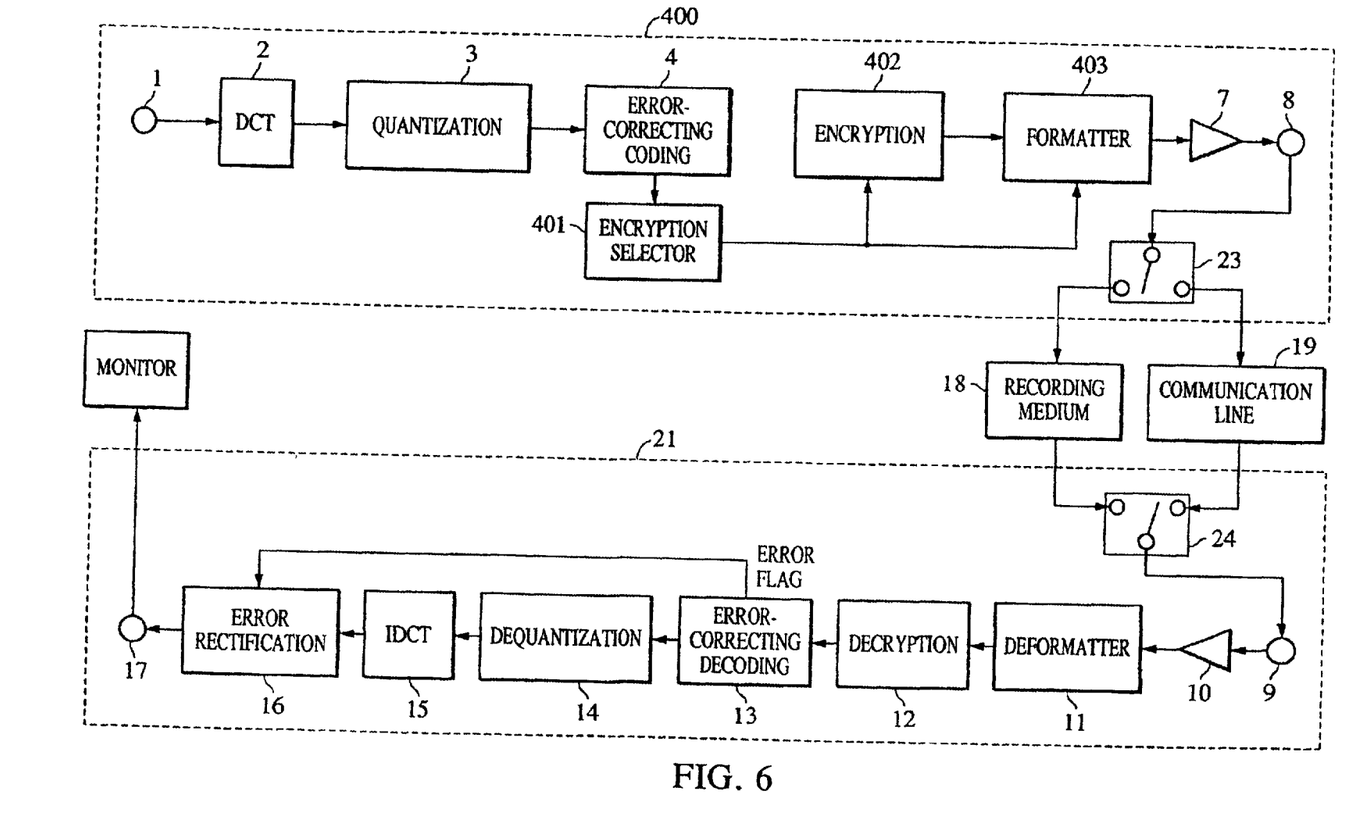
FIG. 6 is a block diagram showing the configuration of an information processing apparatus which represents a second embodiment of the present invention.
Figure 7:
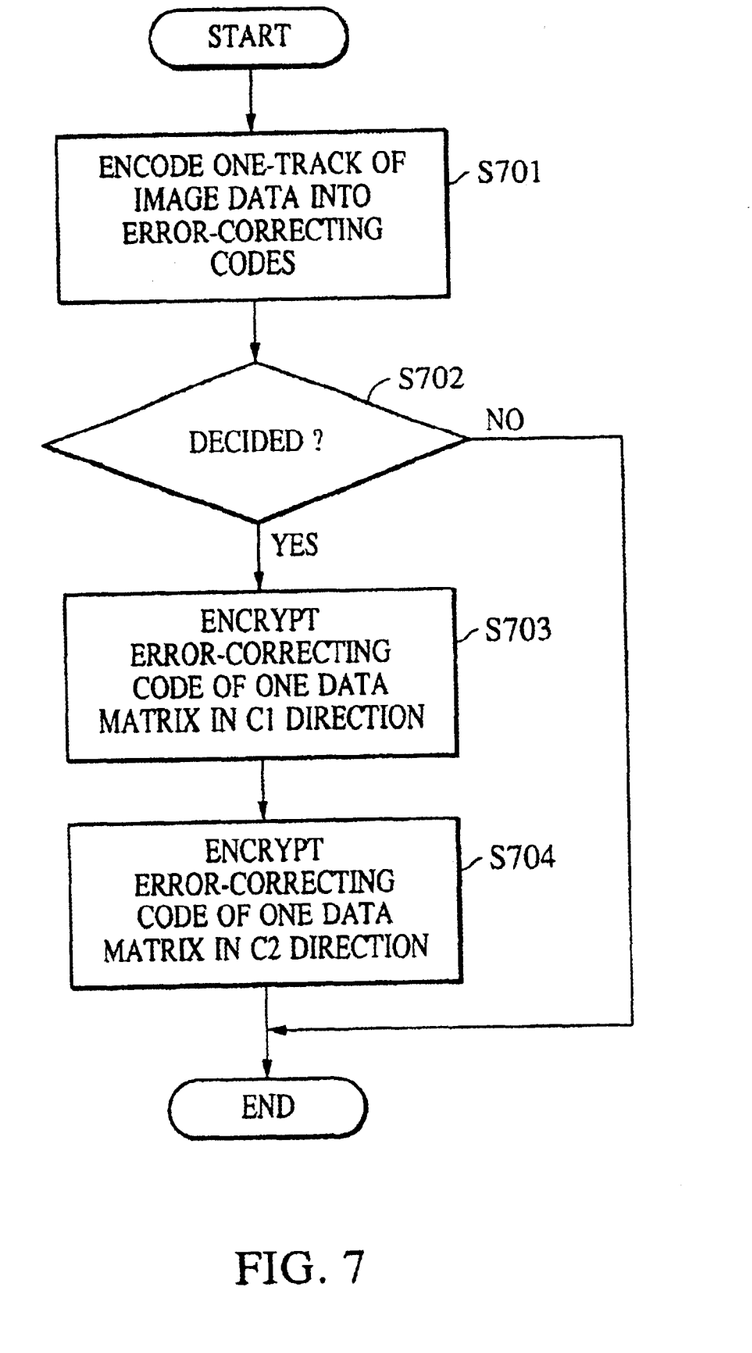
FIG. 7 is a flowchart of an encryption process in the information processing apparatus of the second embodiment.

FIG. 6 is a block diagram showing the configuration of a recording and reproducing apparatus (e.g., a digital video tape recorder) which represents the second embodiment of the present invention. Processing circuits of the second embodiment that are equivalent in configuration and function to those of the first embodiment are indicated by the same reference numerals. FIG. 7 is a flowchart showing the encryption process of the second embodiment. In step S701, one track of image data is encoded into error-correcting codes. In step S702, a decision is made whether the image data is to be encrypted. If the data will not be encrypted, the flow proceeds to the end. However, if the data is to be encrypted, the flow proceeds to step S703. In step S703, an error-correcting code of one data matrix in the C1 direction is encrypted. Then, in step S704, an error-correcting code of one data matrix in the C2 direction is encrypted.

In a recording (or output) unit 400, shown in FIG. 6, digital image data input through an input terminal 1 is orthogonally transformed by a discrete cosine transform (DCT) circuit 2 and is then quantized by a quantization circuit 3, thereby compressing the data.

This compressed digital data undergoes error-correcting coding processing performed by an error-correcting coding circuit 4. An error-correcting-code (comprising information data corresponding to one track and a parity check code) is input to an encryption selector 401 (S701 as shown in FIG. 7). The encryption selector 401 makes a decision as to whether the input data (i.e., error-correcting code) is to be encrypted.

Figure 8A:
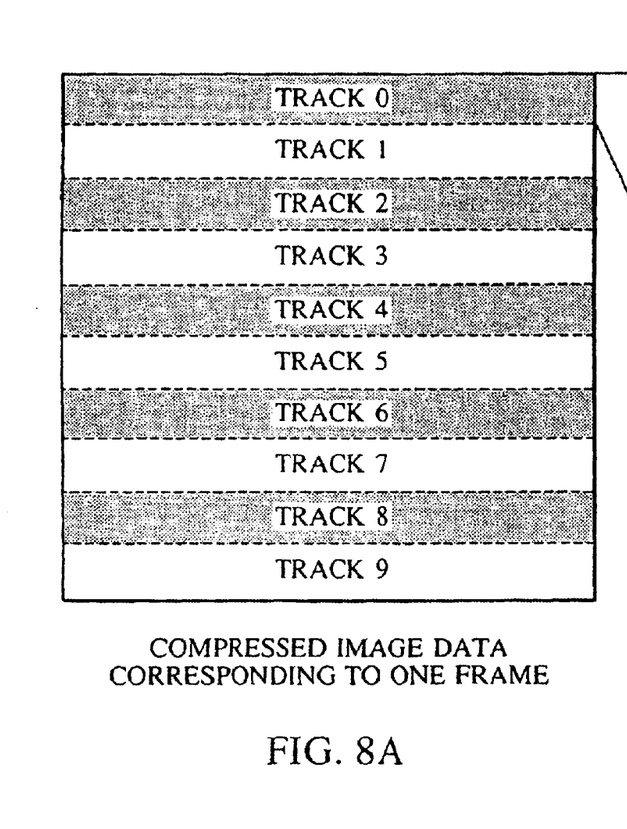
FIGS. 8A and 8B are diagrams showing the construction of a data matrix in the second embodiment.
Figure 8B:
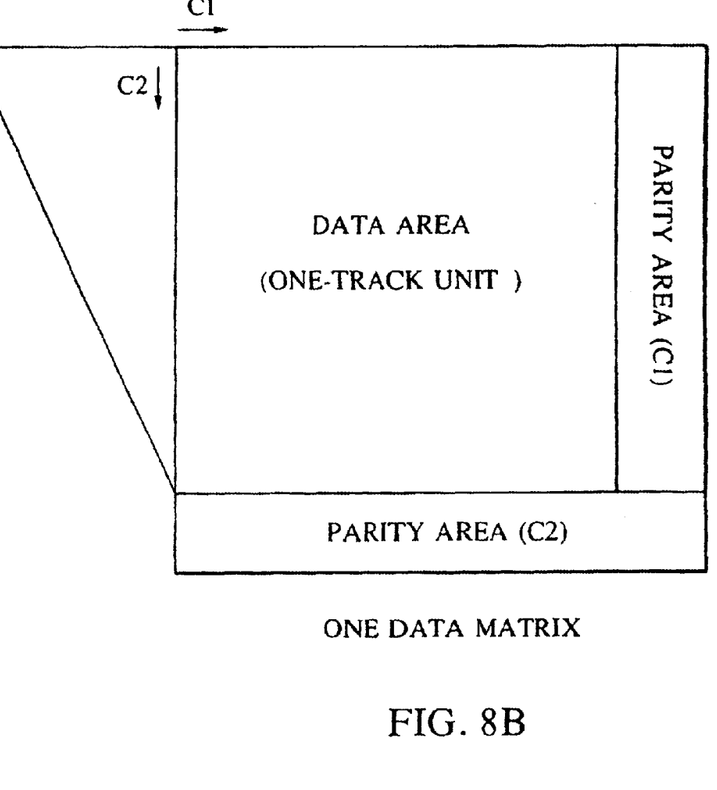

The encryption selector 401 makes this decision with respect to each unit data matrix, identified by referring to a track number or the like, thereby enabling one frame of a compressed image to be encrypted at each previously set image position (that is, with respect to tracks 0, 2, 4, 6, 8), as shown in FIG. 8A. As shown in FIG. 8B, one data matrix is formed of digital image data (corresponding to one track), a parity check code (C1), which is an error-correcting code formed in a C1 direction of the image data, and a parity check code (C2), which is an error-correcting code formed in a C2 direction of the image data. One track is one of ten recording data areas (tracks) for recording one frame of compressed image data. Each data matrix is formed of a plurality of error-correcting codes, as discussed above with respect to the first embodiment.

A data matrix, which is to be encrypted according to a decision made by the encryption selector 401, is encrypted by the encryption circuit 402 (S703 and S704 as shown in FIG. 7). In this encryption, the encryption circuit 402 encrypts at least a portion of the information data and at least a portion of the parity check code (C1 or C2) in each of the error-correcting codes, forming one data matrix. The encrypted data is converted to a predetermined format by a formatter 403, amplified by an amplifier 7, and then output through an output terminal 8.

A data matrix, which is not selected for encryption according to a decision made by the encryption selector 401, is supplied directly to the formatter 403 to be formatted to the predetermined format without being processed by the encryption circuit 402. This data matrix is also amplified by the amplifier 7 and output through the output terminal 8.

An example of the amplifier 7 is a recording amplifier, and an example of the output terminal 8 is a recording terminal. Encrypted data, output from the output terminal 8, is recorded on a recording medium 18. If the output terminal 8 is connected to an external network (communication line) 19 (by or through connector 23), encrypted data, output from the output terminal 8, is transmitted to an external apparatus (not shown) via the network 19. The transmitted data is then used in an application operating in the external apparatus or recorded on a recording medium 18.

In the second embodiment of the present invention, as described above, each of the data matrices, identified by referring to a predetermined track number or the like, is set as a an encryption unit, and only data matrices at previously set image positions are encrypted. Other data matrices are recorded or output without being encrypted. Non-encrypted data portions can be processed by an apparatus or a transmission destination terminal having no decryption circuit, and these data portions are allowed to be displayed on a screen, for example. Consequently, even a user without the recording and reproducing apparatus of the second embodiment can monitor portions of the contents of the above-described reproduced or externally supplied image data.

The operation of reproducing encrypted data or externally supplying encrypted data in the second embodiment is substantially the same as that in the first embodiment. In the second embodiment, however, the decryption circuit 12 and the error-correcting decoding circuit 13 operate as described below, since information data (of portions of one frame) and at least a portion of the parity data are encrypted.

That is, the decryption circuit 12 decrypts only the encrypted portions of the formatted digital image data corresponding to one frame, and the error-correcting decoding circuit 13 performs error-correction processing based on the parity check codes decrypted or the parity check codes that are not originally encrypted.

Image data in which portions of one frame are encrypted can be decrypted by performing decryption processing with the recording and reproducing apparatus of the second embodiment of the present invention. Thus, only a user who uses the recording and reproducing apparatus of the second embodiment can correctly process reproduced or externally supplied encrypted data. On the other hand, an unauthorized user can only reproduce the non-encrypted image data if the user uses the reproducing (or input) apparatus shown in FIG. 5.

That is, in the apparatus shown in FIG. 5, each encrypted data portion is supplied to the error-correcting decoding circuit 13 without first being decrypted. As a result, the flag indicating correction failure is set with respect to the non-decrypted data portion. In the apparatus shown in FIG. 5, therefore, the encrypted image data cannot be processed normally. Instead, only the non-encrypted image data is processed normally.

Figure 9:
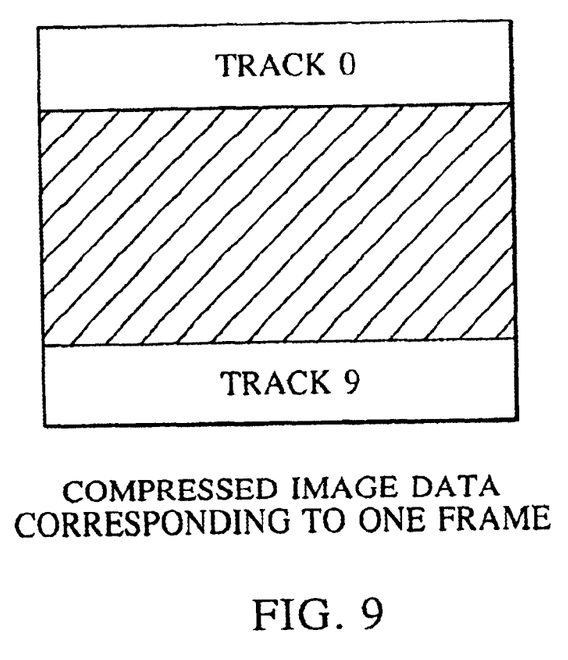
FIG. 9 is a diagram for explaining encryption processing in the second embodiment.

The encryption circuit 402 of the second embodiment may, therefore, be arranged to encrypt only a central portion of an image, as shown in FIG. 9, for example. FIG. 9 shows compressed image data corresponding to one frame. In such a case, the apparatus shown in FIG. 5 cannot normally display the central portion of the image. Thus, unauthorized copying or the like of the image is prevented and the copyright on the image is protected. However, the remaining image portion, other than the central portion, can be displayed normally, and a user can monitor the image in the unrestricted area. That is, the limits of encryption processing are controlled according to the level of one's need to achieve prevention of unauthorized copying of image data and protection of the copyright on the image data, as well as to enable unspecified users to roughly grasp the contents of the image data in the unrestricted (i.e., non-encrypted) area.

The first and second embodiments of the present invention have been described with respect to recording and reproducing (or outputting and inputting) of encrypted image data. However, other kinds of digital data, e.g., audio data and text data, may also be processed in the above-described manner. The recording (or output) unit and the reproducing (or input) unit may be combined into one apparatus. Also, these units may be provided separately from each other.

In the above-described embodiments, parity data is formed with respect to each of the vertical and horizontal directions of an image. However, parity data may be formed with respect to only one of these directions.

In the first embodiment, as described above, information data is encoded into first and second error-correcting codes, and at least a portion of the information data and at least a portion of a parity check code in each of the error-correcting codes are encrypted. An apparatus without a corresponding decryption circuit, adapted to this encryption, cannot restore the data. Thus, preventing unauthorized copying of information data and protecting the copyright on the information data are achieved.

In the second embodiment, only part of a plurality of error-correcting codes are encrypted and non-encrypted data portions can be reproduced without the above-described decryption circuit, thereby enabling the contents of information data to be partially recognized. Therefore, if information data processed in this manner is image data, the image can be partially identified even though the data cannot be completely decoded.

The invention may be embodied in other specific forms without departing from the spirit or essential characteristics thereof.

In the above-described first and second embodiments of the invention, at least a portion of the information data and at least a portion of a parity check code contained in the error-correcting codes, in each of C1 and C2 directions, are encrypted. The arrangement of the invention is not limited to this.

Figure 10A:
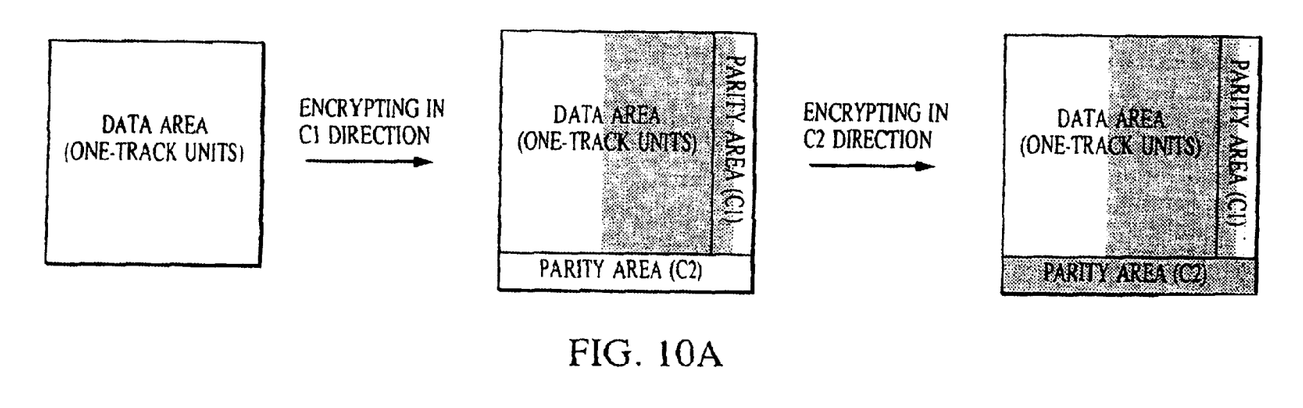
FIGS. 10A and 10B are diagrams for explaining another encryption processing technique or method.
Figure 10B:
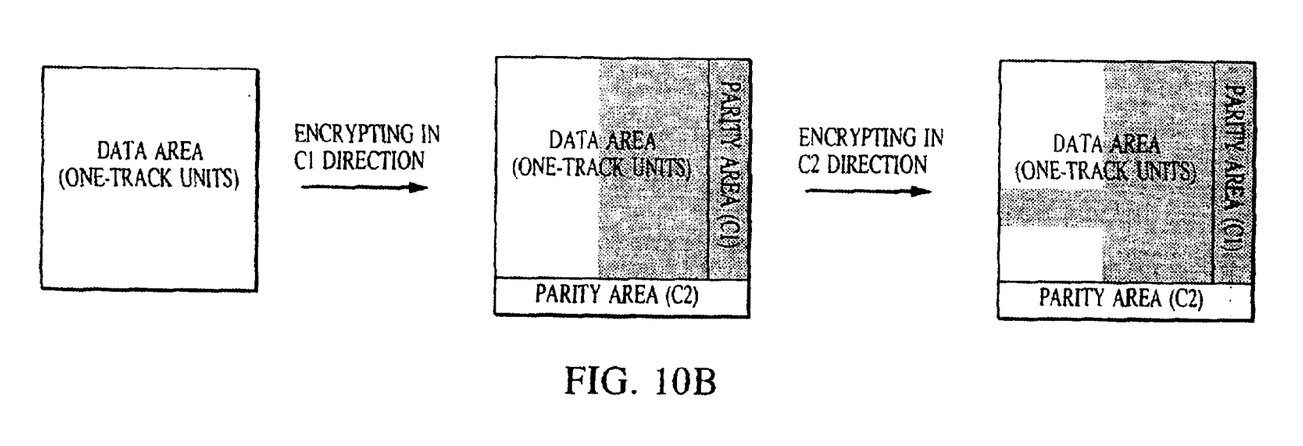

For example, the arrangement may be such that, as shown in FIG. 10A, a portion of information data and a portion of the parity check code in the first error-correcting code are encrypted in the first direction while only the parity check code is encrypted in the second error-correcting code in the second direction. The arrangement may alternatively be such that, as shown in FIG. 10B, a portion of the information data and the entire parity check code are encrypted in the first error-correcting code in the first direction while only a part of information data is encrypted in the second error-correcting code in the second direction. That is, at least a portion of information data and a portion of the parity check code may be encrypted with respect to the error-correcting code in the first direction, and at least a portion of encoded information data or the encoded parity check code is encrypted with respect to the second error-correcting code in the second direction.

As described above, portions of the information data and a plurality of parity check codes (C1 and C2) to be encrypted are suitably combined to reduce the processing time and to output encrypted data with improved security to recording medium 18 or communication line 19.

The individual components shown by blocks in the Drawings are all well-known in the information processing arts and their specific construction and operation are not critical to the operation or best mode for carrying out the invention.

While the present invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An encrypting and decrypting method comprising:

a parity data generating step of generating first and second parity data for compressed image data;

a first encryption step of encrypting both the compressed image data and the first parity data with a first key;

a second encryption step of encrypting the compressed image data and the second parity data with a second key different from the first key;

a first decryption step of decrypting the compressed image data and the second parity data encrypted in the second encryption step;

a second decryption step of decrypting the compressed image data and the first parity data encrypted in the first encryption step; and an error correction step of correcting an error in the decrypted image data using the decrypted first and second parity data.

2. A method according to claim 1, wherein the compressed image data is obtained from a portion of one image.

3. An encrypting and decrypting system comprising:

a parity data generating unit that generates first and second parity data for compressed image data;

an encryption unit that encrypts both the compressed image data and the first parity data with a first key, and that encrypts both the compressed image data and the second parity data with a second key different from the first key;

a decryption unit that decrypts the compressed image data and the second parity data encrypted in the encryption unit, and that decrypts the compressed image data and the first parity data encrypted in the encryption unit; and an error correction unit that corrects an error in the decrypted image data using the decrypted first and second parity data.

4. A system according to claim 3, wherein the compressed image data is obtained from a portion of one image.

* * * * *